UNITED STATES PATENT OFFICE.

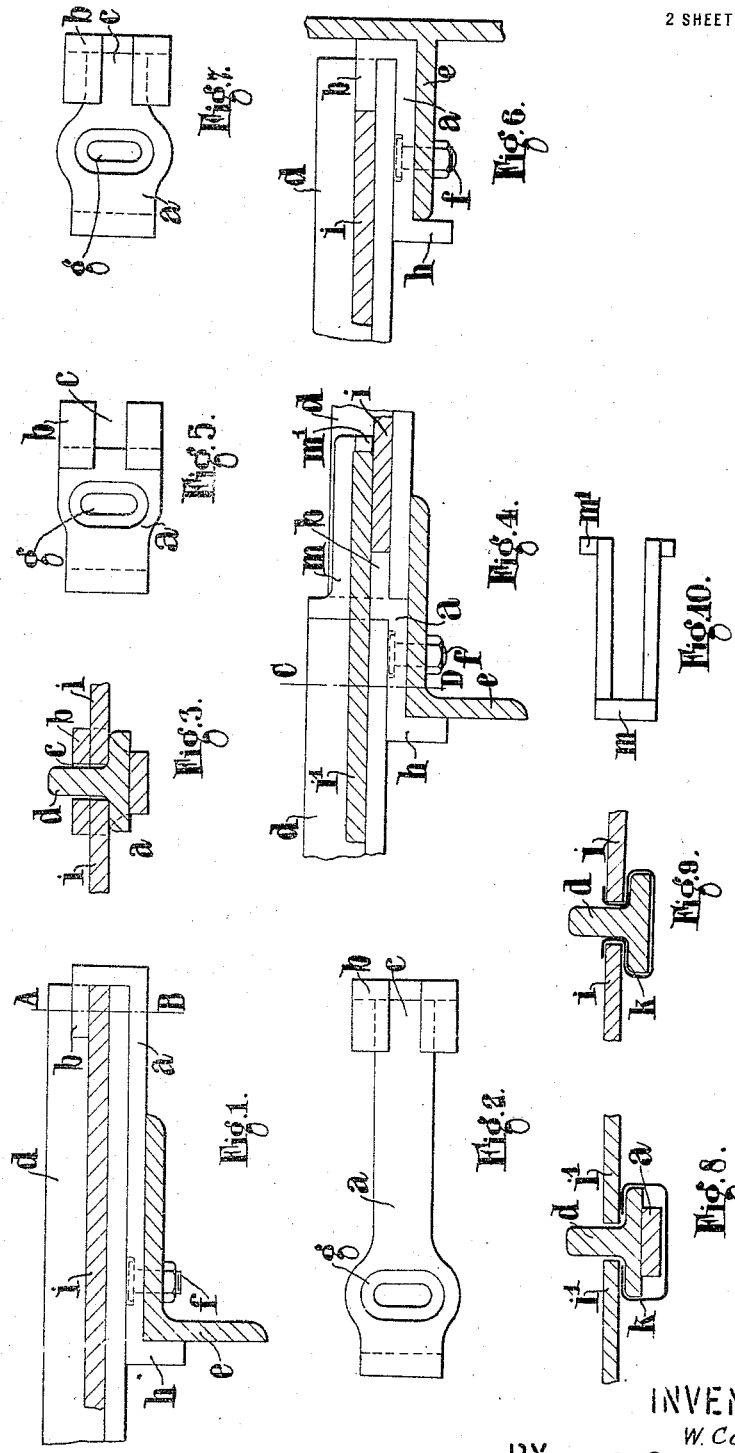

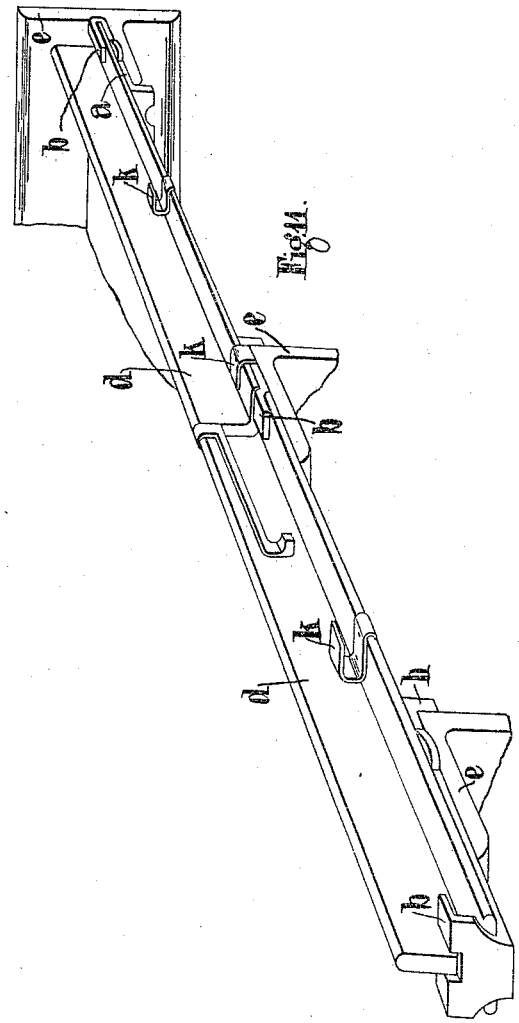

WILLIAM COACKLEY, OF PENDLETON, MANCHESTER, ENGLAND.

FITTING FOR USE IN GLAZING ROOF AND LIKE STRUCTURES.

1,296,924. Specification of Letters Patent. Patented Mar. 11, 1919.

Application filed March 5, 1918. Serial No. 220,470.

*To all whom it may concern:*

Be it known that I, WILLIAM COACKLEY, a subject of the King of Great Britain and Ireland, and resident of 8 Broad street, Pendleton, Manchester, England, have invented certain new and useful Improved Fittings for Use in Glazing Roof and like Structures, of which the following is a specification.

This invention has for its object to provide new or improved fittings for use in glazing roof structures (either horizontal, or inclined roofs, or vertical walls) the said fittings enabling the T astragals and the like to be secured in position without the necessity for any drilling or smithwork on the same so that the said T astragals can be used in the condition in which they leave the rolling mills in which they are made.

My invention comprises the improved fittings for use in glazing roof and like structures as hereinafter described and claimed.

Referring to the accompanying explanatory drawings:—

Figure 1 is a side elevation, Fig. 2 a plan view and Fig. 3 a cross section on the line A B of Fig. 1 showing one of my improved fittings adapted for use at the lower end of a roof structure. In Figs. 1 and 3 the T astragal and the glass supported thereby is shown in position.

Figs. 4 and 5 are views corresponding to Figs. 1 and 2 but showing one of my improved fittings for use in a position intermediate the upper and lower ends of the roof structure where two lengths of glass overlap.

Figs. 6 and 7 are views corresponding to Figs. 1 and 2 but showing one of my improved fittings for use in a position at the upper end of a roof structure.

Fig. 8 is a sectional view taken on the line C D of Fig. 4 showing a form of clip for use in securing the T astragals upon the fittings and Fig. 9 shows a similar fitting for securing the glass upon the T astragals.

Fig. 10 is a detail view to be hereinafter referred to.

Fig. 11 shows two lengths of T astragals with upper, lower and intermediate fittings therefor.

The same reference letters in the different views indicate the same or similar parts.

Each of my improved fittings comprises an arm or part $a$ having a turned up portion $b$ slotted at $c$ to receive the stem $d$ of a T astragal. The fitting is secured upon the angle iron $e$ or like portion (which may be a purlin or scantling) of the roof structure, forming the support of the glazing, by a bolt $f$, the head of which rests in a countersunk slot $g$ in the arm $a$. The end $h$ of the latter is turned down to position the fitting upon its support $e$ and to strengthen the structure against movement due to the weight of the glazing.

In each case, a T astragal is supported upon the part $a$ and has its stem end embraced by the divided turned up end $b$. The latter also serves to position the glass $i$. In the Fig. 1 example, the turned up part $b$ passes over the glass $i$ but in the Fig. 4 example, the glass $i'$ which inclines downward toward the lower glass $i$ rests on the top of the turned up slotted end $b$, while the glass $i$ butts thereagainst. The lower T is supported upon the angle.

In Fig. 8 there is shown a bent metal-plate clip $k$ which I employ to hold the T astragals upon the arms $a$. Fig. 9 shows a similar bent metal-plate clip to secure the edges of the glazing upon the T astragals.

To prevent the upper glass $i'$ resting over the intermediate fitting shown in Fig. 4 from slipping downward, I provide a U shaped element $m$ (Figs. 4 and 10) which engages the upper end of the T astragal and has turned down ends $m'$ which engage the edge of the glass.

By the employment of my invention, considerable economy of labor is obtained in glazing roofs and a simple and efficient securing means for the glass supporting bars provided.

The shape of the fitting may be varied to suit any particular services or requirements.

Having now described my invention what I claim as new and desire to secure by Letters Patent is:—

1. A fitting for use in glazing roof and like structures, comprising an arm part adapted to support a T astragal and having a slotted upturned part to embrace the stem of a T astragal, as set forth.

2. A fitting for use in glazing roof and like structures, comprising an element adapted to support a T astragal and to be itself attached to an angle iron, purlin or scantling upon the roof structure, and having a slotted upturned portion adapted to embrace the stem of a T astragal (supported on the angle iron or the like) adjacent the one supported on the fitting, as set forth.

In testimony whereof I have signed my name to this specification in the presence of two subscribing witnesses.

WILLIAM COACKLEY.

Witnesses:
ARTHUR HUGHES,
HILDA HUGHES.

Copies of this patent may be obtained for five cents each, by addressing the "Commissioner of Patents, Washington, D. C."